Jan. 15, 1957  E. WILDHABER  2,777,306
UNIVERSAL JOINT
Filed June 16, 1953  4 Sheets-Sheet 1

INVENTOR.
ERNEST WILDHABER
BY
ATTORNEY

Jan. 15, 1957 E. WILDHABER 2,777,306
UNIVERSAL JOINT
Filed June 16, 1953 4 Sheets-Sheet 2

INVENTOR.
ERNEST WILDHABER
BY
ATTORNEY

Jan. 15, 1957  E. WILDHABER  2,777,306
UNIVERSAL JOINT

Filed June 16, 1953  4 Sheets-Sheet 3

INVENTOR.
ERNEST WILDHABER
BY
ATTORNEY

INVENTOR.
ERNEST WILDHABER
BY
ATTORNEY

United States Patent Office 2,777,306
Patented Jan. 15, 1957

2,777,306

UNIVERSAL JOINT

Ernest Wildhaber, Rochester, N. Y.

Application June 16, 1953, Serial No. 362,000

15 Claims. (Cl. 64—21)

The present invention relates to universal joints, and more particularly to universal joints capable of transmitting substantially uniform motion. Such joints are usually referred to as constant velocity universal joints. The present application specifically covers an improvement on the universal joint disclosed in my copending application Serial No. 357,818, filed May 27, 1953.

One object of the present invention is to provide a constant velocity joint which is compact and rugged and, which has a long life.

Another object of the invention is to provide a universal joint for automotive use for transmitting substantially uniform motion which will last as long as the vehicle into which it is built and which will require a minimum of attention throughout its life.

A further object of the invention is to provide a constant velocity universal joint in which power is transmitted largely through rolling contact.

Another object of the invention is to provide a constant velocity universal joint which is self-centering and which does not require added structure to attain this end.

Still another object of the invention is to provide a universal joint of the character described in which the end members of the joint are connected by rollers or sliding blocks mounted on a plurality of axes, and in which the holders for the rollers or blocks are geared together, or are otherwise constrained to turn equally and oppositely with respect to the end member on which they are mounted.

A still further object of the invention is to provide a universal joint of the character described in which increased rigidity is attained by mounting the roller or slide holders on intersecting axes inclined to the axis of the end member on which they are mounted.

Other objects of the invention will be apparent hereinafter from the specification and from the recital of the appended claims.

In a universal joint constructed according to the present invention there are a plurality of rollers or sliding blocks connecting the end members of the joint. These rollers are mounted on holders which maintain the roller axes essentially in a plane perpendicular to the axis of one of the two end members of the joint. The rollers engage ways provided in the other end member of the joint. The holders are pivoted on the one end member on an axis inclined to and intersecting the axis of said one end member. The holders are, moreover, operatively interconnected, preferably geared to each other, to constrain adjacent holders to turn simultaneously in opposite directions. As a result two adjacent roller axes move generally in the plane of the roller axes, and by equal amounts in opposite directions. Thus the average motion of the roller axes is transmitted to the end member on which the holders are mounted. This average motion is very nearly uniform.

Figures 1, 2, 3:
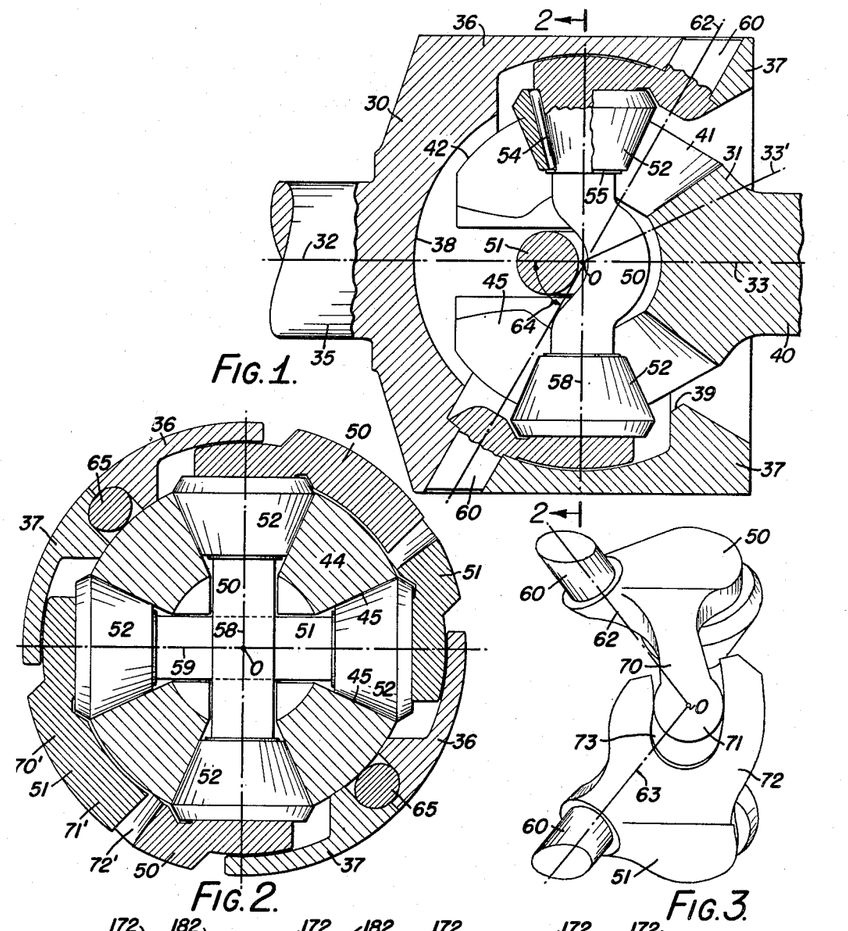
Fig. 1 is an axial section of a universal joint constructed according to one embodiment of the present invention.
Fig. 2 is a section through the joint taken substantially on the line 2—2 of Fig. 1 and looking in the direction of the arrows.
Fig. 3 is a view of the roller holders of the joint and taken from a position approximately 45° clockwise from the top of Fig. 2, looking downwardly on the joint.

Referring now to the drawings by numerals of reference, and first to the embodiment of Figs. 1 to 4 inclusive, 30 and 31 denote the two end members of the joint. In Fig. 1 the two end members are shown at zero position of shaft angularity, that is with their respective axes 32 and 33 in alignment. 33' denotes one position which the axis 33 may occupy in operation of the joint.

The end member 30 has a shaft portion 35 and a socket portion made up of two parts 36 and 37 which are rigidly secured together. Socket portion 36 is integral with shaft portion 35, and is formed with a concave spherical inside surface 38. Socket portion 37 is formed with a concave spherical inside surface 39 which is a continuation of the concave spherical surface 38.

The end member 31 has a shaft portion 40 and a ball head 41 which has an outside spherical surface 42 adapted to engage concave spherical surface 38. The ball head 41 contains four equally spaced grooves or slots which extend along axial planes and are spaced equiangularly about the axis 33 of end member 31. The sides 45 of these slots or grooves converge toward the axis 33 of the end member.

Motion between the two end members 30 and 31 is transmitted through two connecting members or holders 50 and 51. Each of these holders carries a pair of tapered rollers 52. The two rollers of a pair are disposed, respectively, at opposite sides of axis 33. The rollers are mounted on their respective holders through tapered needle bearings 54 and are held against inward axial displacement by snap rings 55.

Each holder 50, 51, is first made in two parts, each of which carries a roller 52. After assembly of the rollers on the two parts of each holder, the two parts are placed in a fixture for alignment and are then welded together to form a single integral holder 50, or 51, carrying a pair of rollers 52.

The two rollers 52 of each holder engage sides 45 in diametrically opposite slots of the ball head 41. The axis 58 of the rollers 52 carried by the holder 50 intersects the axis 59 of the rollers 52 carried by the holder 51 in the point O at which the axes 32 and 33 of the two end members intersect. The two holders are formed, as clearly shown in Fig. 1, so that they may pass each other, each being bent so that it will not interfere with the other in the central plane of the joint.

Each holder has a pair of coaxial pivot portions 60 (Fig. 3) at opposite ends which are formed integral with the holder. These pivot portions are disposed outwardly of the rollers 52, that is, further away from center O. The axes 62 and 63 of these pivot portions pass through the center O and are inclined at acute angles 64 (Fig. 1) to the axis 32 of the end member 30. The axis 62 lies in a plane containing the axis 32 and the roller axis 58 in the position of the latter at zero shaft angularity. Similarly the axis 63 of the pivot portions 60 of the holder 51 lies in the plane containing the axis 32 and the roller axis 59. In other words, at zero shaft angularity the roller axis 58 or 59 lies in a plane containing the pivot axis 62 or 63 and the axis 32 of the end member 30. The angle between the roller axis 58, or 59, and the pivot axis 62 or 63, as the case may be, is preferably kept below 30° so that the load is taken up by each pivot 60 nearer the associated roller 52.

Through this pivotal mounting of each holder the roller axis 58, or 59, of the holder moves about the center O generally along the central plane of rotation of the end member 30 as the end member turns about the pivot axis 62 or 63. The central plane of rotation is perpendicular to the axis 32 of the end member 30 and passes through center O. In its motion the roller axis 58 or 59 describes a conical surface about the pivot axis 62 or 63, as the case may be, a conical surface which is tangent to said central plane of rotation.

The pivot axes 62 and 63 lie in planes which contain the axis 32 of the socket member and which extend at right angles to each other. The two axes 62 and 63 themselves include an acute angle with each other. The socket parts 36, 37 are split in the plane of the pivot axes. They are held together by coupling teeth (not shown) and screws 65 (Fig. 2).

The two holders 50 and 51 have portions engaging one another as shown in Fig. 3. The holder 50 has at one end outwardly of one roller 52 and outwardly of the arms 44 of the ball head 41 a lateral projection 70 which has an enlarged circular end portion 71. The end portion 71 engages in a slot 73 in a furcated portion 72 projecting laterally from the adjacent end of the holder 51. At its opposite end the holder 50 is provided outwardly of its other roller 52 and outwardly of the arms 44 of the ball head 41 with a furcated portion 72' (Fig. 2), like furcated portion 72, which engages an enlarged portion 71', like portion 71, of a projection 70' formed on the holder 51. The sides of the slot 73 in furcated portion 72 and of the corresponding slot in furcated portion 72' are shaped to effect uniform motion of one holder on its pivot 62 on uniform rotation of the other holder on its pivot 63. Thus the two holders 50 and 51 are constrained to move oppositely to one another about their respective pivotal axes 62 and 63. For moderate shaft angularity a straight slot may be used in place of the curved slot 73.

Through the operative connections 70, 72, and 70', 72' of the holders, the holders may turn through varying angles but are constrained to turn always equally in opposite directions. As they do so they move their roller axes generally in the central plane of rotation equally toward each other or equally away from each other.

The operation of the universal joint of Figs. 1 to 3 inclusive will be described particularly with reference to the diagram of Fig. 4. In this figure, 75 is the central plane of rotation of the end member 30. The holder 50 is at the right of each pair; the holder 51 at the left. Adjacent pairs represent views 180° apart taken from the outside looking toward the inside. The diagram shows the holders tilted about their respective pivot axes 62, 63 in opposite directions.

Let us first imagine that there is no operative connection between the two holders. When both end members of the universal joint are turned at a uniform rate the roller axes 58, 59 will move periodically about the pivot axes 62, 63. This motion substantially repeats for every half turn like the motion transmitted in a Cardan joint. The two roller axes have the same motion but not at the same time. There is a phase difference of 90° caused by the fact that the engaged ways 45 in end member 31 are 90° apart. As this difference is half of the total cycle, the motions of the two roller axes about their pivot axes are in opposite phase. As one advances, the other lags back. The operative connection 70—72, 70'—72' between the two holders 50, 51 causes their average motion to be transmitted to the end member 30 on which the holders are pivoted. It is very nearly uniform motion. The load is exerted on all the rollers 52 in the same general direction, for instance from right to left. Looking from the outside at the pair of holder portions at left, this load tends to turn the holder 50 as well as the holder 51 in a clockwise direction on their pivots. In the zone of engagement, the holder 50 tends to move up while holder 51 tends to move down. They balance each other. If one turns in one direction, the other is bound to turn in the opposite direction of rotation.

In the embodiment of the invention shown in Figs. 6 to 10 inclusive the end members are denoted at 80 and 81, respectively. End member 80 has an internal member or sleeve 82 rigidly secured to it by a nut 83. The internal member or sleeve 82 has internal ways whose side surfaces 84 are plane surfaces extending in the direction of the axis 85 of this end member. The end member 80 has projections 86 engaging in the ends of the ways 84 and acting as keys. Nut 83 exerts pressure on the end member 80 through a disc 87 and a rubber gasket 88, which serves as a seal. A reliable and tight driving connection between the member 80 and the sleeve or integral member 82 is thus provided.

Figure 6:
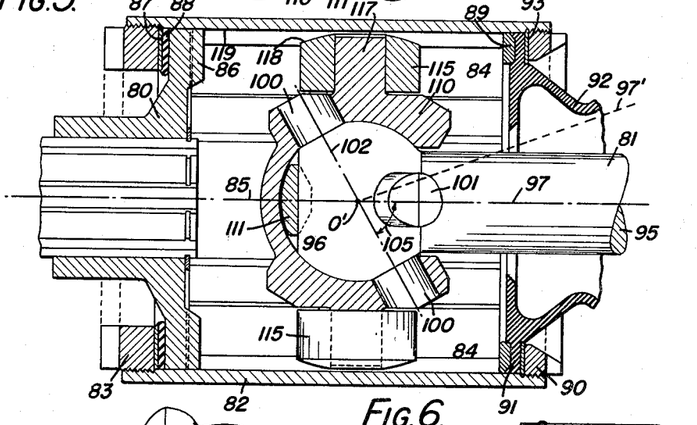
Fig. 6 is an axial section of a universal joint constructed according to another embodiment of the present invention.

On the opposite end of sleeve 82 a disc 89 rests against the ends of the ways formed by sides 84. An internal nut 90 threads into the internal member 82 and exerts pressure on a disc-like projection 91 of a flexible seal 92 through a disc 93. The seal 92 is, therefore, securely held. It surrounds the shaft portion 95 of the end member 81.

The end member 81 of the universal joint is an external member with a shaft portion 95 and a head 96. It is shown in Fig. 6 with its axis 97 in alignment with the axis 85 of the end member 82. The dotted line 97' indicates an angular position of the axis 97 in operation of the joint.

Figures 7, 8, 9:
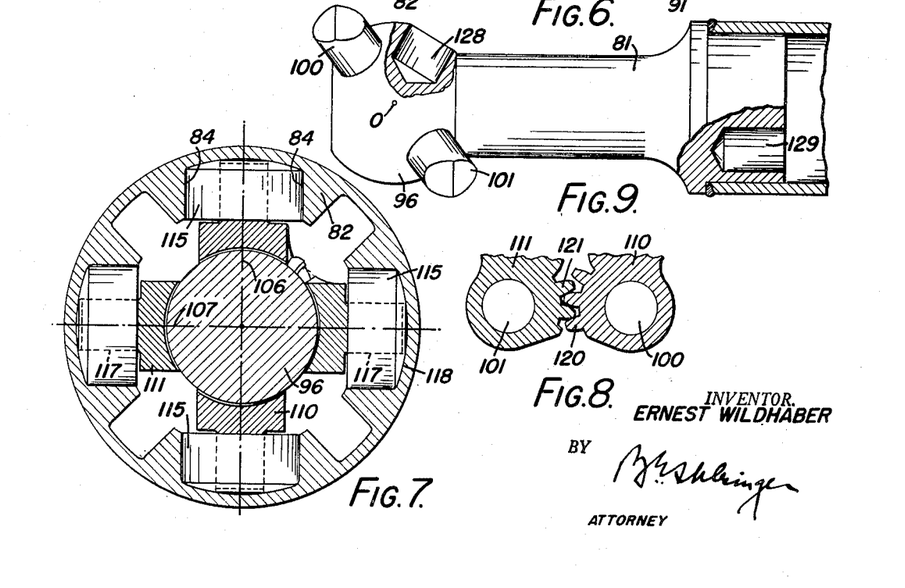
Fig. 7 is a section through the joint of Fig. 6 taken at right angles to the drawing plane, and similar to the section of Fig. 2.
Fig. 8 is a fragmentary spherical section through the pivots of adjacent holders of the joint of Figs. 6 and 7 showing their geared connection.
Fig. 9 is a side elevation, with parts broken away, showing the end member which contains the pivots in the joint of Figs. 7 and 8, this end member being shown at a position 45° from the position shown in Fig. 6.

The head 96 of the end member 81 has two pairs of diametrically opposed integral pivot portions designated 100 and 101, respectively. Each pair of pivot portions constitutes a pivot for a roller holder. Pivot portions 101 alternate with pivot portions 100 around the head 96 and successive pivot portions are disposed 90° apart around the head. The axes of the two pivots pass through the intersection point O' of the axes 97 and 85 of the two end members and are inclined at an acute angle 105 to the axis 97 of the end member 81. The axis of pivot portions 100 is designated at 102 in Fig. 6. The two pivot axes lie in axial planes of end member 81, which planes are at right angles to each other. In Fig. 7 the pivot axes project into the lines 106 and 107.

Two roller holders 110 and 111, respectively, are mounted pivotally on the two pivots. Each holder is first made in two halves; and then the two halves are welded together in a fixture after assembly on the pair of the pivot portions 100 or 101 which make up the pivot of the pair.

A pair of coaxial rollers 115 or pivoted parts are mounted on each holder. The rollers 115 are mounted rotatably on pin-like portions 117 which project outwardly from the holders 110 and 111 and which are integral with the respective holders. The two pairs of rollers have axes 106 and 107 which are exactly perpendicular to the axis 97 of the end member 81 at least in the position of zero shaft angularity. In this position the roller axis 106 lies in the axial plane containing the axis 97 and the pivot axis of its holder 110. Likewise, the roller axis 107 lies then in the axial plane containing the axis 97 and the pivot axis of its holder 111. The pivot axis and the roller axis of a holder include an acute angle with each other preferably less than 30°.

The rollers 115 engage the sides 84 of the ways formed in the sleeve 82. They have spherical outside surfaces 118 (Fig. 7) which contact the cylindrical bottoms 119 (Fig. 6) of the ways.

Figure 10:
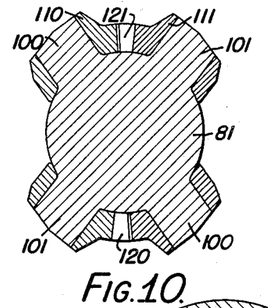
Fig. 10 is a section through both pivot axes of the joint of Figs. 6 to 9 inclusive and showing the end member, which has the pivots, and parts of the roller holders.

The two holders 110, 111 are geared together as seen in Figs. 8 and 10. The holder 110 has gear teeth 120 meshing with gear teeth 121 on the holder 111. This operative connection causes the two holders to turn on their pivots simultaneously and in opposite directions of rotation. They also turn through equal angles on their pivot axes and thus fulfill the design requirement of a constant velocity universal joint.

Figures 4, 5:
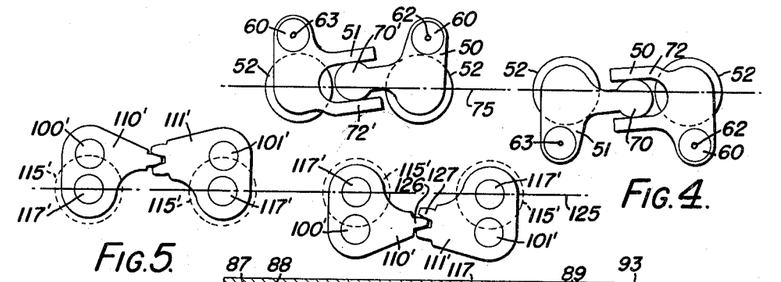
Fig. 4 is a diagrammatic developed view on a smaller scale showing the operative interconnection of the roller holders of Figs. 1 to 3, the view being a development of a cylindrical surface coaxial with that end member of the joint on which the roller holders are mounted, the circumference being developed into a plane.
Fig. 5 is another diagrammatic developed view, similar to Fig. 4, but disclosing another embodiment of the invention.

The diagram of Fig. 5 refers to the embodiment of Figs. 6 to 10 inclusive and to further embodiments. 125 denotes the central plane of rotation. Here we have holders 110' and 111' mounted on pivots 100', 101', respectively, and geared together by the gear teeth 126 and 127. These gear teeth mesh to cause the holders to rotate simultaneously on their pivots 117' by equal amounts in opposite directions of rotation. The holders carry rollers 115' similar to the rollers 115. Again the holders maintain each other in balance.

On universal joints for high speed operation it is desirable to achieve full mass balance, at least in aligned position. The gear teeth, which connect the holders, are essentially in line with the pivot axes. The gear teeth of the holders represent additional mass which would cause a clockwise inertia moment if unbalanced. Instead of adding mass for balance I preferably provide recesses, that is, I subtract mass at the proper places. I provide holes 128 and 129 (Fig. 9) on end member 81. If mass would be added in those places instead of being subtracted it would cause a clockwise inertia moment. Through the substraction a counter-clockwise inertia moment is obtained to balance the clockwise inertia moment caused largely by the disposition of the gear teeth.

The gear teeth 120, 121 (Fig. 8) are preferably so arranged that contact is at or adjacent the pitch point of the teeth in forward driving in the central swinging position of the holders. The showing of Fig. 8 corresponds to a driving pressure which tends to turn both holders 110, 111 in counterclockwise direction. At the pitch point the teeth engage each other with pure rolling contact.

Figure 11:
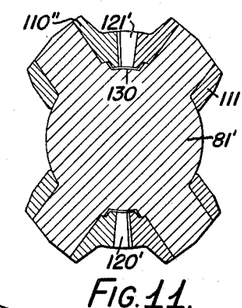
Fig. 11 is a section similar to Fig. 10 but showing a modification of the invention.

Fig. 11 is a section through the pivot axes, similar to Fig. 10. Its only difference from the embodiment shown in Fig. 10 is that recesses 130 are provided in the head 81' in order to make it possible to increase the length of the gear teeth 120', 121' which connect the holders 110'', 111''.

Figure 12:
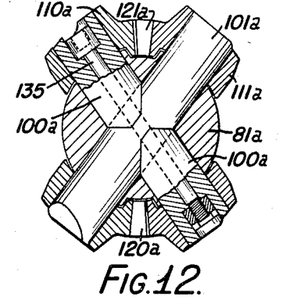
Fig. 12 is also a section similar to Fig. 10 showing a further modification of the invention.

Fig. 12 illustrates a still further embodiment of the invention. It is also a section through the pivot axes. Here the pivot portions are not made integral with the head 81a but are inserted parts. One pivot 101a is made up of a single pin inserted into the head 81a. The other pivot comprises two individual pin portions 100a which fit the pin 101a at their inner ends and are held together by the bolt or screw 135. This bolt passes through a bore in the pin 101a thereby securing the pin 101a, also, in position. The holders 110a and 111a may be mounted similarly as before and geared together by gear teeth 120a, 121a, in a manner similar to the embodiment of Fig. 10.

Figures 13, 15, 24:
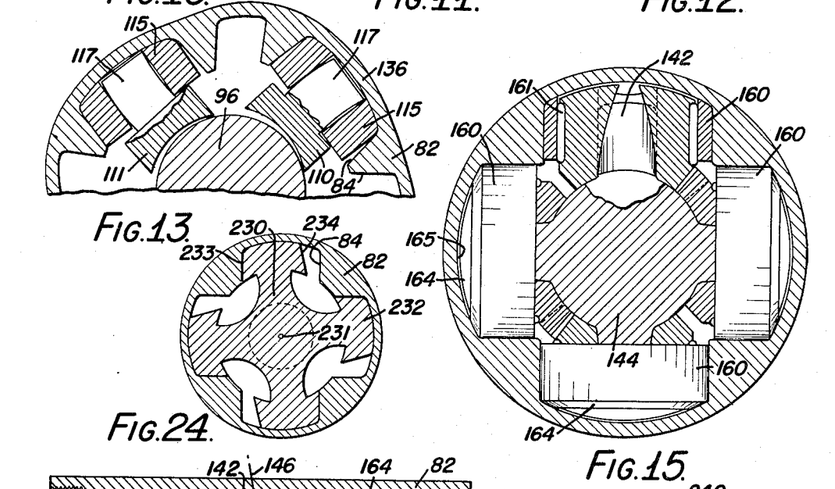
Fig. 13 is a fragmentary section, similar to Fig. 7, but showing exaggeratedly deformations that take place in the joint of Fig. 7 under load, and illustrating a preferred principle of design of the joint of the invention.
Fig. 15 is a section, similar to the sections of Figs. 2 and 7, through the joint of Fig. 14.
Fig. 24 is a cross-section showing the internal member of a universal joint built according to this invention and illustrating diagrammatically one way of lapping the sides of the guideways of this member.

Fig. 13 illustrates a preferred feature of the invention. It shows exaggeratedly the deflections of a universal joint under heavy load. The rollers, and especially the portions mounting the rollers, bend back, so that each roller has an angular deflection about an axis parallel to the axis 97 (Fig. 6). If the internal member 82 were absolutely rigid then the roller would bear on the inner end of its profile only. But the internal member deflects too. In accordance with my invention its wall thickness at 136 is so determined that the side surfaces 84 of the ways have the same angular deflection as the roller supports. If this is accomplished, contact pressure applied to the roller is centered near the middle of the roller profile; and no one-sided pressure results under heavy load.

Computation of the deflection characteristics is possible, but rather involved. The easiest procedure is by trial and test. It is best to start out with an ample wall thickness 136. Either the roller surfaces or the ways, or both, are painted, for instance, with red lead as used in gear testing. The load is then applied. This may be done at zero shaft angularity. Then the internal member 82 is moved back and forth along its axis relative to the roller holders under load. The mark then shows the location of the contact. Where both the rollers and the ways have been painted, the contacting surface portions are swept clean of paint after prolonged axial reciprocation.

If the wall at 136 is too thick, the contact marking will be adjacent the inner ends of the rollers. The internal member is then ground to a smaller outside diameter so that the wall thickness at 136 is reduced. Then the test is repeated. It is repeated several times until the marked area is centered near the middle of the roller profile. Then the contact pressure is centered near the middle of the roller profile.

The wall thickness so determined is then provided in the universal joints to be produced in quantity. This will maintain the contact pressure near the center of the roller profile at all loads provided that the joint is accurately made. The above procedure avoids failure through one-sided loading, and substantially increases the load capacity of the universal joint. It is preferably employed in all embodiments, especially in those with internal members.

A further embodiment of the invention will now be described with reference to Figs. 14 to 16. It is similar to the embodiment of Figs. 6 to 10 and uses a similar internal member 82. Its external member 141 also contains two pairs of pivot portions 142, 143 integral with and projecting from its head 144. The axes 146, 147 of the pivots formed by these pivot portions are inclined at an acute angle to the axis 149 of the external end member 141. This angle, which is shown at 148 for pivot axis 146, is here larger than in the embodiment of Figs. 6 to 10, so that the axes 146, 147 are less inclined to the central plane of rotation 150 which passes through the center O" and is perpendicular to the axis 149 of the external end member 141. O" is also the intersection point of the axes 149, 85 of the members 141, 82. The pivot axes 146, 147 are equally inclined to the axis 149 and lie in two planes therewith which are at right angles to each other. Each pivot 142, 143 consists of two diametrically opposite pivot portions.

A holder 155 is mounted on the pivot portions 142; and a holder 156 is mounted on the pivot portions 143. Each of the two holders is made in two halves welded together after assembly on its pivots, if the pivots are formed integral with the head 144 and with each other. Each holder can be made up in one piece from the start if inserted pivots are provided of the nature indicated in Fig. 12. A pair of coaxial rollers 160 are mounted on each holder 155, 156 by needle bearings 161.

Figure 14:
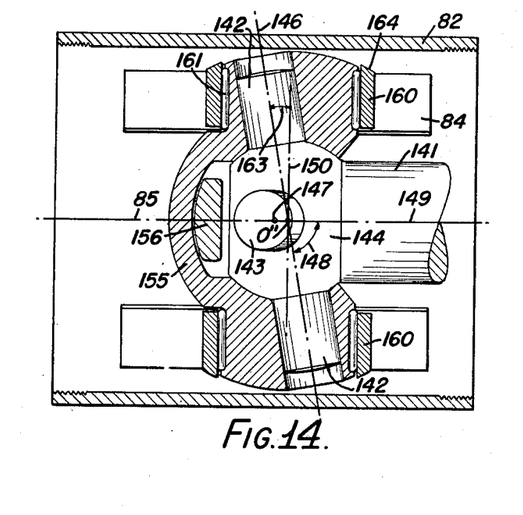
Fig. 14 is an axial section similar to Figs. 1 and 6 and illustrating a further embodiment of the invention.

The chief difference between the modification of Figs. 14 and 15 and the embodiment of Figs. 6 to 10 is that the rollers surround the pivot portions 142, 143. The pivot portions reach inside the rollers. The bearing portions which mount the rollers extend all around the pivot portions. Load of the rollers is, therefore, transmitted more directly to or from the pivots; and also the motion about the pivots at a given shaft angularity is larger in this embodiment. Here the acute angle 163 (Fig. 14) between the pivot axis of a holder and its roller axis is smaller than 15°.

Rollers 160 have spherical outside surfaces 164 which bear against the cylindrical bottom surfaces 165 (Fig. 15) of the ways 84. They are held in place by this contact against the slight outward pressure of the centrifugal inertia force of the rollers.

The four roller contacts completely center the internal member. There is no need for any bearing shoes such as commonly provided on joints with only a single pair of rollers. This is true for all embodiments. Accordingly, such shoes are preferably omitted.

As in the embodiment of Figs. 6 to 10 the two holders 155, 156 are geared together at diametrically opposite regions by gear teeth 167, 168 (Fig. 16) formed on the two holders, respectively. The holders contain beveled gear teeth meshing with each other. The teeth here are loaded much less than the rollers because of their larger leverage with respect to the pivot axes 146. 147 as compared with the leverage of the rollers. A mass balance arrangement similar to that used in Fig. 9 may also be employed in this embodiment of the invention.

Figures 16, 17, 18, 19, 22:
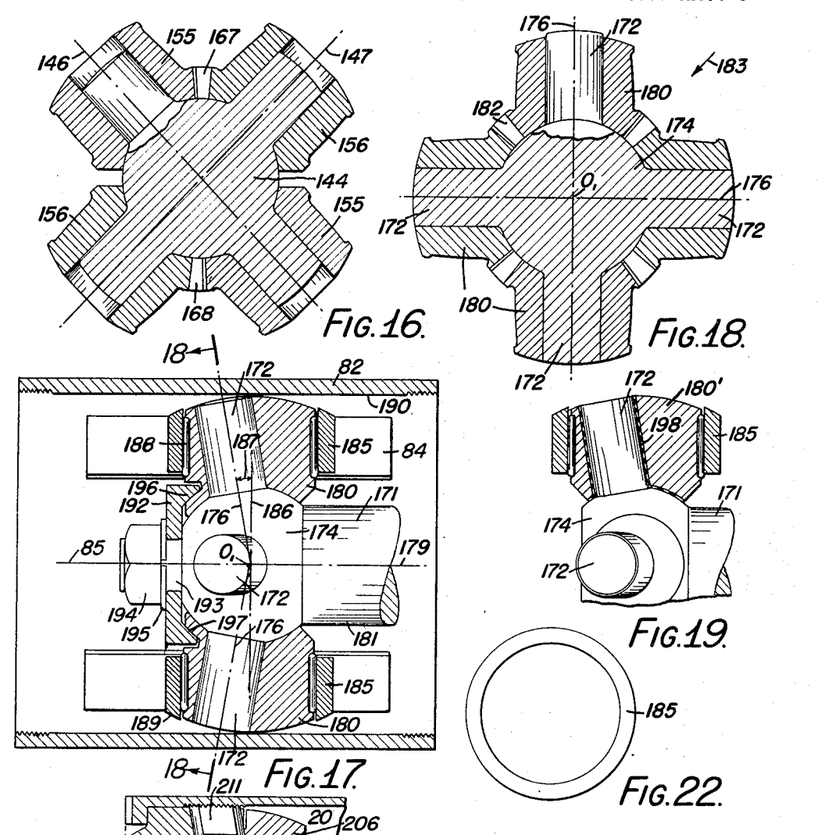
Fig. 16 is a section through the joint of Figs. 14 and 15 taken through both pivot axes.
Fig. 17 is an axial section, similar to the sections of Figs. 1, 7 and 14, of a joint constructed according to a still further embodiment of the invention.
Fig. 18 is a section taken through the four pivot axes of the joint of Fig. 17, the section being taken along the lines 18—18 of Fig. 17 looking in the direction of the arrows.
Fig. 19 is a part elevation, part axial section, of a roller holder and end member similar to those shown in Fig. 17 but constructed according to a slight modification thereof.
Fig. 22 is an end view on an enlarged scale of a roller such as may be used in the joints of Figs. 14 to 18 inclusive.

A still further embodiment of the invention is illustrated in Figs. 17 and 18. It uses the kind of internal end member 82 previously described and an external end member 171 having a head 174. The head 174 has pivot portions 172 equally spaced about its axis 179. The axes 176 of the pivot portions include acute angles with the axis 179 of the end member 171, and also an acute angle with the central plane of rotation of the member 171. The latter passes through the intersection point of the axes 85, 179 of the two end members which are here shown in alignment.

In this embodiment of the invention each pivot portion has its own axis 176. The pivot portions are not arranged in coaxial pairs as in the previously described embodiment of the invention. The pivot axes 176 lie on a conical surface whose apex is at $O_1$ and which is coaxial with the end member 171. The said conical surface can be described by rotating one of the pivot axes 176 about the axis 179 of the end member 171.

The pivot portions may be tilted toward the shaft end 181 of the end member 171 or away from it as may be desired. A holder 180 is mounted on each pivot portion 172. There are, therefore, four holders 180 in this embodiment of the invention. They are geared together by bevel gear teeth 182, as seen in Fig. 18, to turn simultaneously in opposite directions about their pivots. Each holder is geared to both adjacent holders. Viewed in the direction of arrow 183 (Fig. 18) adjacent holders turn on their pivots in opposite directions of rotation, and they turn through equal angles. A roller 185 is rotatably mounted on each holder with its roller axis 186 passing through point $O_1$. The roller axis 186 forms an acute angle 187 with the pivot axis 176, and in the aligned position of the end members lies in the axial plane laid through the axis 179 and the pivot axis 176, including a right angle with the axis 179.

Each roller 185 is mounted through a needle bearing 188 on its holder. It has an outside spherical surface 189 adapted to bear against the cylindrical bottom surface 190 of the way it engages.

The holders themselves are seated on the ball head 174, and are held against outward displacement along a pivot axis by an end disc 192. This disc has a square central hole to secure it against rotation. It is rigidly secured to the ball head 174 by a central projection 193 of the ball head and a nut 194 which threads onto this central projection and exerts pressure against the disc 192 through the washer 195. The projection 193 has a square shank matching the square hole in the disc 192. Disc 192 has lateral projections 196 having a spherical inside surface 197. The projections 196 engage in notches in the holders 180 and have their inside spherical surfaces 197 engaging outside spherical surfaces provided on the holders. This engagement permits limited turning motion of the holders on their pivots.

With the arrangement shown in this embodiment, the holders are free to turn on their respective pivots, but, as before, they balance one another. Here also, the transmitted motion is very nearly uniform, even at substantial shaft angularity. In other words, this is also a constant velocity joint under accepted interpretation of the term.

Fig. 19 shows a slight modification from Fig. 17. Here the holder 180' is mounted on its pivot 172 by means of a rubber bearing 198. The rubber is bonded to both the pivot 172 and to the holder 180'. The term "rubber" means any substance having elastic properties comparable to those of natural or synthetic rubber.

Figure 20:
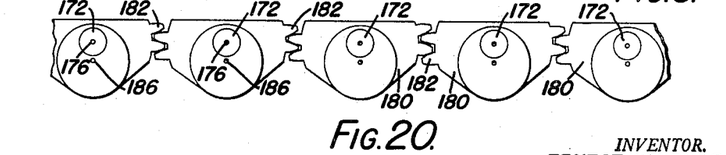
Fig. 20 is a diagrammatic developed view, similar to the views of Figs. 4 and 5 and further illustrating the structure of the joint of Figs. 17 and 18.

Fig. 20 is a diagram similar to Fig. 5 illustrating further the embodiment of Figs. 17 and 18. The roller centers 186 are movable about the pivot axes 176. Each holder keeps balance with the other. Each holder is geared to both adjacent holders. If one holder tips up slightly, the adjacent holders tip down. The roller centers move periodically toward and away from each other at substantial shaft angularity.

Figure 23:
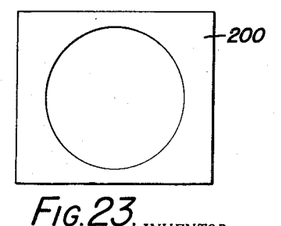
Fig. 23 is an end view of a sliding block such as may be used in these joints.

Fig. 22 shows a roller 185 and Fig. 23 shows a sliding block 200 such as may be used, one in place of the other, in the embodiments of Figs. 14 to 16 inclusive and of Figs. 17 and 18. Also plain bearings may be used in these embodiments, if desired, in place of the needle bearings shown.

Figure 21:
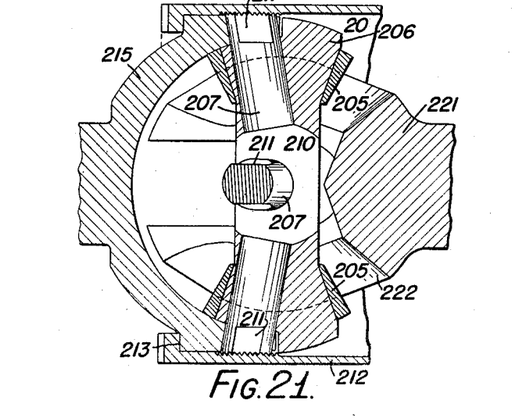
Fig. 21 is an axial section through a joint constructed according to a still further modification of the invention.

Fig. 21 illustrates an embodiment similar to those in Figs. 17 and 18, but using tapered rollers 205. They are shown mounted on their holders 206 by plain bearings. However, needle bearings may also be used. The four pivots 207 are formed integral with each other and with a ball head 210. The pivot portions are flattened out at their outside ends as denoted at 211 and their outside end surfaces are threaded. Their threads engage in an internally threaded sleeve 212 which bears against shoulder 213 on end member 215. The pivot cross is drawn onto seats provided on end member 215 by turning the sleeve 212. The plane sides of these seats then hold the flattened out portions 211 of the pivots.

The holders 206 are geared to each other at the outside in a way such as indicated in the diagram in Fig. 20. The other end member 221 of the joint is provided with ways 222 which are tapered in cross section and which are engaged by the rollers 205. They are similar to the ways shown in Figs. 1 and 2.

The straight ways 84 (Figs. 7, 14 and 17) of the internal member 82 can be broached. They can be either lapped or ground after hardening. Fig. 24 illustrates a way of lapping with a lap 230 whose axis 231 coincides with the axis of the internal member 82. The lap may be made of cast iron. It is provided with four radially extending arms which have at their extremities lapping projections 232 having opposite sides 233 and 234. The angular width of these arms is less than the angular width of the ways. The lap arms are under-cut in the manner shown so that the lap can be worn down a great deal without forming a groove. A groove on the lap is detrimental at the slightest variation of the inside diameters of the internal members. The lap is reciprocated along its axis in engagement with one side of the ways 84 under moderate pressure while a lapping compound is continuously applied, as in the lapping of gear teeth. After one or several strokes the internal member is indexed relative to the lap so that each projection 232 of the lap engages successively each way of the internal member. The same procedure is followed for the other side of the ways. In this lapping process the four ways are equalized.

Figure 25:
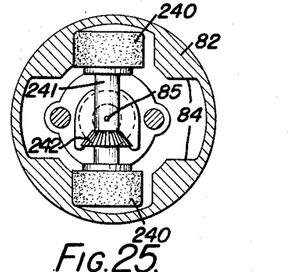
Fig. 25 is a cross-section similar to Fig. 24 illustrating one way of grinding the sides of the guide-ways of the internal member.

Fig. 25 shows a way of grinding the sides of the ways 84 with a pair of grinding wheels 240. These wheels are coaxial and mounted on a common spindle 241 which may be driven in any suitable way as by bevel gears 242. The two wheels grind in diametrically opposite ways 84 and they grind on the same sides of the wheels. The wheel spindle 241 is eccentric of the axis 85 of the internal member 82. The work 82 is reciprocated axially with respect to the grinding wheels. After one or several strokes the work is indexed. After indexing four times both sides of the four ways will have been covered. The process may be continued until the ways have been completely ground. The wheels are set in toward grinding engagement between successive passes over the same surfaces, and, of course, they may be dressed from time to time.

The gear teeth used to operatively connect adjacent holders in any of my embodiments are of any suitable known shape. They may have known involute, circular, or cycloidal profiles. Also, while I have shown a disc member 192 (Fig. 17) to retain the holders 180 against outward displacement along their pivots, I may also dispense with such a member. Each holder then bears with its outside spherical surface 189 against the inside cylindrical surface 190 of the way 84 into which it projects. Each holder 180 is then held in place axially in the same way as each roller 185, namely, through engagement with the bottom surface of the way.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint for operatively connecting two end members which have intersecting axes, comprising a plurality of holders pivotally mounted on one of said end members on pivot axes fixed relative to said one end member and inclined to and intersecting the axis of said one end member in a common point, the other end member being provided with ways, means connecting said holders operatively to one another to turn on their pivots simultaneously in opposite directions, and parts rotatably mounted on said holders and engaging said ways.

2. A universal joint for operatively connecting two end members which have intersecting axes, comprising a plurality of holders pivotally mounted on one of said end members on pivot axes fixed relative to said one end member and intersecting the axis of said one end member in a common point and inclined to the axis of said one end member at an angle of at least sixty degrees, the other end member being provided with ways, said holders having portions engaging each other to cause them to turn simultaneously on their pivots, and parts rotatably mounted on said holders and engaging said ways.

3. A universal joint comprising two end members having intersecting axes, two holders pivotally mounted on one of said end members on intersecting pivot axes fixed relative to said one end member and inclined to the axis of said one end member, said pivot axes intersecting the axis of said one end member in a common point, each holder being pivotally mounted on said one end member on two diametrically opposite pivot portions, the other end member being provided with a plurality of ways, and a pair of coaxial parts rotatably mounted on each holder, said parts engaging said ways, and said holders having meshing gear teeth for causing said holders to turn simultaneously on their pivots in opposite directions.

4. A universal joint comprising two end members having intersecting axes, two holders pivotally mounted on one of said end members on intersecting pivot axes fixed relative to said one end member and inclined to the axis of said one end member, said pivot axes intersecting the axis of said one end member in a common point, each holder being pivotally mounted on said one end member on two diametrically opposite pivot portions, the other end member being provided with a plurality of straight, internal ways extending in the direction of its axis, and a pair of coaxial rollers rotatably mounted on each holder, said rollers engaging said ways, and said holders having meshing gear teeth for causing said holders to turn simultaneously on their pivots in opposite directions.

5. A universal joint comprising two end members having intersecting axes, one of said end members having two pairs of pivot members fixed relative to said one end member, the pivot members of each pair being diametrically opposite each other and the axes of both pairs of pivot members being inclined to the axis of said one end member and intersecting the axis of said one end member in a common point, the other end member having straight, internal ways extending in the direction of its axis, a one-piece holder journaled on each pair of pivot members, said two holders being geared together to cause said holders to turn on their pivots simultaneously, and a pair of coaxial parts rotatably mounted on each holder and engaging said ways.

6. A universal joint comprising two end members having intersecting axes, one of said end members having two pairs of pivot members fixed relative to said one end member, the pivot members of each pair being diametrically opposite each other and the axes of both pairs of pivot members being inclined to the axis of said one end member and to its central plane of rotation at an acute angle, said pivot axes intersecting the axis of said one end member in a common point, the other end member having straight, internal ways extending in the direction of its axis, a one-piece holder journaled on each pair of pivot members, said two holders being geared together to cause said holders to turn on their pivots simultaneously, and a pair of coaxial rollers rotatably mounted on each of the two holders, said rollers surrounding said pivots and engaging said ways.

7. A universal joint comprising two end members having intersecting axes, one of said end members having two pairs of diametrically opposite pivot portions, the axis of each pair being inclined to and intersecting the axis of said one end member, said pivot axes intersecting the axis of said one end member in a common point, the other end member being provided with ways, a holder journaled on each pair of pivot portions, said holders having interengaging portions to cause said holders to turn simultaneously on their respective pivots, and a pair of coaxial parts rotatably mounted on each holder on an axis inclined at an acute angle to its pivot axis, said parts engaging said ways.

8. A universal joint comprising two end members having intersecting axes, two holders pivotally mounted on one of said end members on pivot axes fixed relative to said one end member and inclined to and intersecting the axis of said one end member in a common point, said other end member being provided with ways, said holders having interengaging portions to cause said holders to turn simultaneously on their pivots, a pair of coaxial parts rotatably mounted on each holder on an axis inclined at an acute angle to its pivot axis, said parts engaging said ways, and said one end member being provided with recesses for mass balance.

9. A universal joint for operatively connecting two end members which have intersecting axes, one of said members being provided with ways, the other of said members having a plurality of pivots fixed relative to said other end member whose axes are inclined to the axis of said one end member and intersect in a common point and all lie on one side of a plane perpendicular to the axis of said one end member and passing through said common point, holders pivotally mounted on said pivots for pivotal movement about the axes of said pivots, and a part rotatably mounted on each holder and engaging one of said ways, adjacent holders being geared together to turn on their pivots simultaneously in opposite directions.

10. A universal joint for operatively connecting two end members having angularly disposed and intersecting axes, one of said end members having a plurality of pairs of ways, a pair of holders, a pair of rollers engaging each pair of ways, each pair of rollers being rotatably mounted on one of said holders for rotation on a common axis, and a pair of diametrically opposite, coaxial pivot pins fixedly secured to each holder and connecting each holder directly to the other end member for pivotal movement about an axis fixed relative to the other end member, the last-named axis being inclined to the axis of said rollers and intersecting the axes of said end members in their point of intersection, said holders having interengaging portions which constrain said holders to turn on their pivots simultaneously in opposite directions with respect to each other.

11. A universal joint for operatively connecting two end members which have angularly disposed and intersecting axes, one of said members being provided with a plurality of equi-spaced, internally-disposed slots extending axially of the axis of said one end member, the other end member having a ball head and being provided with a plurality of pivot projections fixed to said ball head, a plurality of holders pivotally mounted on said pivot projections for pivotal movement about axes extending transversely of the axis of said other end member and intersecting the axis of said other end member in a common point, a part rotatably mounted on each holder for rotation about an axis inclined to the pivotal axis of said holder, each said part engaging in one of said slots, and means constraining adjacent holders to move about their pivots simultaneously in opposite directions.

12. A universal joint for operatively connecting two end members which have angularly disposed and intersecting axes, one of said members being provided with a plurality of equi-spaced, internally-disposed slots extending axially of the axis of said one end member, the other end member having a ball head and being provided with a plurality of pivot projections fixed to said ball head, a plurality of holders pivotally mounted on said pivot projections for pivotal movement about axes extending transversely of the axis of said other end member and intersecting the axis of said other end member in a common point, a roller rotatably mounted on each holder and surrounding a pivot projection for said holder, each roller engaging in one of said slots, and means constraining adjacent holders to move about their pivots simultaneously in opposite directions.

13. A universal joint for operatively connecting two end members which have angularly disposed and intersecting axes, one of said members being provided with a plurality of equi-spaced, internally-disposed slots extending axially of the axis of said one end member, the other end member having a ball head and being provided with two pairs of diametrically opposite, coaxial pivot projections fixed to said ball head, a pair of holders, each holder being pivotally mounted on one pair of projections for pivotal movement about an axis extending transversely of the axis of said other end member and intersecting the axis of said other end member in the point of intersection of the axes of the two end members, the pivotal axis of one holder being inclined to the pivotal axis of the other holder, a pair of diametrically opposite rollers rotatably mounted on each holder for rotation about an axis inclined to the pivotal axis of the holder and passing through said point of intersection, each roller surrounding one of the pivot projections for its holder and each roller engaging in one of said slots, and means constraining the two holders to move about their pivotal axes simultaneously in opposite directions.

14. A universal joint for operatively connecting two end members which have angularly disposed and intersecting axes, one of said end members having a ball head provided with a plurality of slots extending in the general direction of its axis, the other end member having a socket portion to receive said ball head, a member rigid with said other end member and having a plurality of pivot projections fixed thereto, a plurality of holders, said holders being pivotally mounted on said pivot projections for pivotal movement about axes extending transversely of the axis of said other end member and intersecting the axis of said other end member in the point of intersection of the axes of the two end members, the pivotal axis of one holder being inclined to the pivotal axis of another holder, a tapered roller rotatably mounted on each holder for rotation about an axis inclined to the pivotal axis of its holder and passing through said point of intersection, each roller surrounding a pivot projection for its holder and each roller engaging in one of said slots, and means connecting said holders to one another to constrain adjacent holders to move simultaneously in opposite directions about their pivotal axes.

15. A universal joint for operatively connecting two end members which have angularly disposed and intersecting axes, one of said end members having a ball head provided with a plurality of slots extending in the general direction of its axis, the other end member having a socket portion to receive said ball head, a member rigid with said other end member and having a plurality of pivot projections fixed thereto, a plurality of holders, said holders being pivotally mounted on said pivot projections for pivotal movement about axes extending transversely of the axis of said other end member and intersecting the axis of said other end member in the point of intersection of the axes of the two end members, the pivotal axis of one holder being inclined to the pivotal axis of another holder, a tapered roller rotatably mounted on each holder for rotation about an axis inclined to the pivotal axis of its holder and passing through said point of intersection, each roller surrounding a pivot projection for its holder and each roller engaging in one of said slots, means connecting said holders to one another to constrain adjacent holders to move simultaneously in opposite directions about their pivotal axes, and a sleeve threaded onto the outer ends of said pivot projections and engaging said other end member to secure said pivot projections to said other end member.

References Cited in the file of this patent

UNITED STATES PATENTS

| | | |
|---|---|---|
| 2,284,199 | Greiner | May 26, 1942 |
| 2,469,713 | Coleman | May 10, 1949 |
| 2,599,596 | Wildhaber | June 10, 1952 |
| 2,607,175 | Osplack | Aug. 19, 1952 |
| 2,613,486 | Praeg | Oct. 14, 1952 |
| 2,627,734 | Villard | Feb. 10, 1953 |